(12) United States Patent
Jeong

(10) Patent No.: US 6,420,810 B1
(45) Date of Patent: Jul. 16, 2002

(54) NON-CONTACT DRIVING MOTOR

(75) Inventor: Dae Hyun Jeong, Suwon-Shi (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 3 days.

(21) Appl. No.: 09/594,361

(22) Filed: Jun. 15, 2000

(30) Foreign Application Priority Data

Mar. 29, 2000 (KR) .......................................... 2000-16060

(51) Int. Cl.[7] .................................................. H02K 7/09
(52) U.S. Cl. .................................... 310/90.5; 370/90.5
(58) Field of Search ..................... 310/90.5, 90, 67 R; 384/100, 107

(56) References Cited

U.S. PATENT DOCUMENTS

| | | | | |
|---|---|---|---|---|
| 3,384,427 A | * | 5/1968 | McHugh | 310/90.5 |
| 3,791,704 A | * | 2/1974 | Perper | 308/10 |
| 4,934,791 A | * | 6/1990 | Kato et al. | 350/6.8 |
| 5,019,738 A | * | 5/1991 | Weilbach et al. | 310/90.5 |
| 5,357,162 A | | 10/1994 | Aiyoshizawa et al. | 310/90 |
| 5,358,339 A | | 10/1994 | Konno et al. | 384/107 |
| 5,469,007 A | * | 11/1995 | Toyama | 310/90.5 |
| 5,777,414 A | * | 7/1998 | Conrad | 310/90.5 |
| 5,783,886 A | * | 7/1998 | Hong | 310/90.5 |
| 6,201,329 B1 | * | 3/2001 | Chen | 310/90.5 |

* cited by examiner

Primary Examiner—Nestor Ramirez
Assistant Examiner—Dang Dinh Le
(74) Attorney, Agent, or Firm—Darby & Darby

(57) ABSTRACT

A non-contact driving motor capable of keeping its non-contact state irrespective of its start-up or stoppage condition, thereby obtaining a semi-permanent durability. The motor including a housing, a sleeve extending upwardly from the housing, a stator assembly fitted around the sleeve, a vertical shaft rotatably inserted in the sleeve, a rotor assembly including a rotor case coupled to an upper end of the shaft, and an annular driving magnet attached to an outer peripheral end of the rotor case in such a fashion that it faces the stator assembly, an annular first magnet attached to an inner peripheral surface of the sleeve at an upper end of the sleeve, an annular second magnet attached to an outer peripheral surface of the shaft in such a fashion that it faces the first magnet in a horizontal direction, a disc-shaped third magnet fitted around a lower end of the shaft, a disc-shaped fourth magnet attached to the inner peripheral surface of the sleeve above the third magnet in such a fashion that it faces the third magnet in a vertical direction, and a disc-shaped fifth magnet attached to a cap covering the lower end of the sleeve beneath the third magnet in such a fashion that it faces the third magnet in a vertical direction.

4 Claims, 4 Drawing Sheets

NON-CONTACT DRIVING MOTOR

BACKGROUND OF THE INVENTION

1. Field of the Invention

The present invention relates to a non-contact driving motor capable of keeping its non-contact state irrespective of its start-up or stoppage condition, thereby obtaining a semi-permanent durability.

2. Description of the Prior Art

Typically, motors, which are used to drive compact precise appliances, have slightly different configurations in accordance with different using purposes, respectively.

In such diverse motors, in particular, motors for a high-speed driving, a hydraulic or pneumatic dynamic pressure bearing is typically used in order to minimize friction generated between a driving member and a fixed member.

When a motor drives at a high speed, the connection portions of a driving member and a fixed member supporting the driving member come into severe contact with each other, thereby generating severe friction. This friction may serve as a load for reducing the driving force of the motor or may generate severe abrasion and noise.

In order to solve such a problem, a fluid such as oil or air is interposed between the connection portions of the driving and fixed members to locally create dynamic pressure between those connection portions. By virtue of such a hydraulic or pneumatic dynamic pressure, the friction generated between the connection portions of the driving and fixed members is reduced, thereby allowing a high-speed driving of the motor.

Referring to FIG. 1, a motor is illustrated which uses a conventional pneumatic dynamic pressure bearing. As shown in FIG. 1, the motor includes a shaft 4 mounted to a circuit board 1 at its lower end, and a sleeve 5 surrounding the shaft 4. A rotor case 6 is integrally formed with the sleeve 5 so that they constitute a rotor assembly rotating about the shaft 4.

The circuit board 1 is provided with a separate holder 2 for firmly holding a stator assembly 3 including a core wound with coils. The rotor case 6 is attached with an annular driving magnet 7 arranged around the stator assembly 3 while being radially spaced apart from the stator assembly 3. The above mentioned configuration is similar to those of typical motors.

In the case illustrated in FIG. 1, the motor also includes a means for supporting axial and radial weights of the rotor assembly during a rotation of the rotor assembly.

That is, upper and lower dynamic pressure generating grooves 4a are formed at the peripheral surface of the shaft 4 inserted in the sleeve 5. The dynamic pressure generating grooves 4a generate dynamic pressure during an operation of the motor, thereby supporting a lateral or radial movement of the rotor assembly, that is, a radial weight of the rotor assembly.

Also, a pair of annular magnets 8 and 9 each of which have opposite poles vertically arranged, are attached to respective facing surfaces of the shaft 4 and rotor case 6 at the upper end of the shaft 4. As shown in FIG. 2, these magnets 8 and 9 face each other in a horizontal direction in such a fashion that the horizontally facing poles thereof have opposite polarities, so that they attract each other at their facing surfaces. By virtue of such an attraction, the magnets 8 and 9 serve to prevent the rotor case 6 from moving vertically with respect to the shaft 4. That is, the magnets 8 and 9 support the axial weight of the rotor case 6.

In accordance with the above mentioned configuration, therefore, the space between the shaft 4 and sleeve 5 in the radial direction of the shaft 4 is maintained by virtue of the dynamic pressure generating grooves 4a, thereby preventing any lateral or radial movement of the rotor assembly whereas the facing magnets 8 and 9 generate an attraction between the shaft 4 and rotor case 6, thereby preventing any axial movement of the rotor case 6.

However, this motor having the above mentioned configuration can be maintained in a non-contact state only when it rotates at a high speed under the condition in which no external impact or load is applied thereto. Under the condition in which the motor is in a stoppage or start-up state, at least the shaft 4 and the sleeve 5 may come into frictional contact with each other in accordance with an external impact or load applied to the motor or the rotating speed of the motor. In the latter case, an abrasion occurs due to the frictional contact, thereby degrading the characteristics of the motor. In particular, such an abrasion reduces the use life of the motor, thereby resulting in a degradation in the product.

SUMMARY OF THE INVENTION

Therefore, an object of the invention is to provide a non-contact driving motor which includes a pair of facing magnets having the same polarity at their facing surfaces and serving as an axial and radial weight supporting means, so that it keeps its non-contact state irrespective of its stoppage, start-up, low-speed driving, or high-speed driving condition, thereby achieving an improvement in the driving characteristics thereof.

Another object of the invention is to provide a non-contact driving motor having a complete non-contact drivability, thereby being capable of achieving a great extension of the use lift and an improvement in the reliability of the product.

In accordance with one aspect, the present invention provides a non-contact driving motor comprising: a housing; a sleeve extending upwardly from a central portion of the housing and having a tube shape; stator assembly fitted around the sleeve, the stator assembly including a combination of a core and coils; a vertical shaft rotatably inserted in the sleeve; a rotor assembly including a rotor case centrally coupled to an upper end of the shaft, and an annular driving magnet attached to an outer peripheral end of the rotor case in such a fashion that it faces the stator assembly; an annular first magnet attached to an inner peripheral surface of the sleeve at an upper end of the sleeve; an annular second magnet attached to an outer peripheral surface of the shaft in such a fashion that it faces the first magnet in a horizontal direction; a disc-shaped third magnet fitted around a lower end of the shaft, the third magnet having a diameter larger than the diameter of the shaft; a disc-shaped fourth magnet attached to the inner peripheral surface of the sleeve at a level upwardly spaced apart from the third magnet by a desired distance in such a fashion that it faces the third magnet in a vertical direction; and a disc-shaped fifth magnet attached to a cap covering the lower end of the sleeve at a level downwardly spaced apart from the third magnet by a desired distance in such a fashion that it faces the third magnet in a vertical direction.

In accordance with another aspect, the present invention provides a non-contact driving motor comprising: a housing; a sleeve extending upwardly from a central portion of the housing and having a tube shape; a stator assembly fitted around the sleeve, the stator assembly including a combination of a core and coils; a vertical shaft rotatably inserted in the sleeve; a rotor assembly including a rotor case centrally coupled to an upper end of the shaft, and an annular driving magnet attached to an outer peripheral end of the rotor case in such a fashion that it faces the stator assembly; a disc-shaped first magnet attached to an upper end of the sleeve and magnetized with N and S poles vertically arranged; a disc-shaped second magnet attached to the rotor case in such a fashion that it faces the first magnet in a vertical direction above the first magnet, the second magnet being magnetized with N and S poles vertically arranged in such a fashion that it has the same polarity as the first magnet at facing surfaces thereof; a disc-shaped third magnet attached to an upper surface of a flange integrally formed at a lower end of the shaft, the third magnet being magnetized with N and S poles vertically arranged; a disc-shaped fourth magnet attached to an inner peripheral surface of the sleeve in such a fashion that it faces the third magnet in a vertical direction above the third magnet, the fourth magnet being magnetized with N and S poles vertically arranged in such a fashion that it has the same polarity as the third magnet at facing surfaces thereof; an annular fifth magnet attached to the inner peripheral surface of the sleeve between the first and fourth magnets, the fifth magnet being magnetized with N and S poles radially arranged; and an annular sixth magnet attached to a peripheral surface of the shaft in such a fashion that it faces the fifth magnet in a horizontal direction, the sixth magnet being magnetized with N and S poles radially arranged in such a fashion that it has the same polarity as the fifth magnet at facing surfaces thereof.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
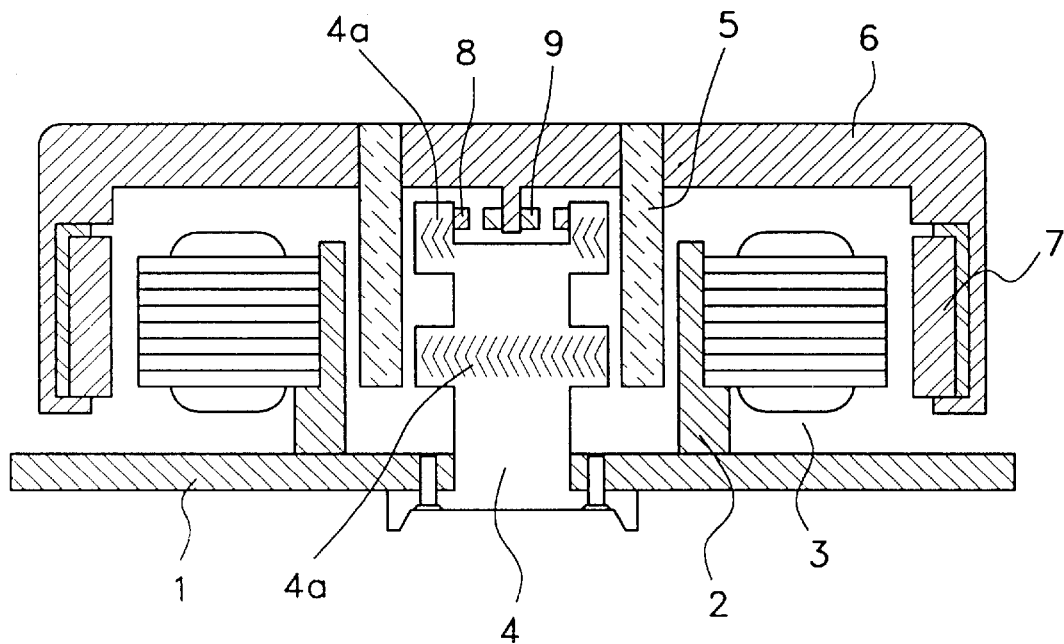
FIG. 1 is a cross-sectional view illustrating a motor using a conventional pneumatic dynamic pressure bearing.
Figure 2:
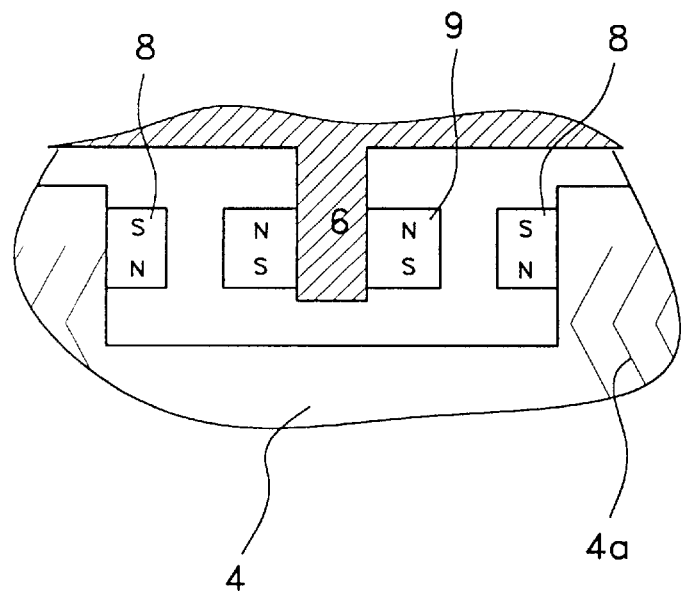
FIG. 2 is an enlarged view illustrating a part of the motor shown in FIG. 1.
Figure 3:
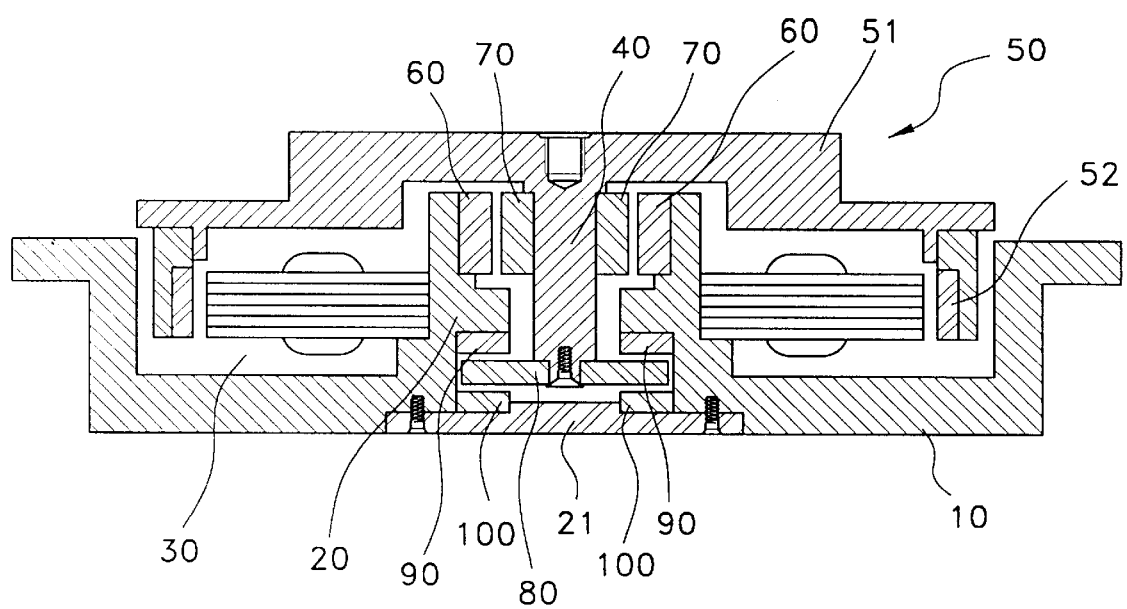
FIG. 3 is a cross-sectional view illustrating a non-contact driving motor according to an embodiment of the present invention.

Referring to FIG. 3, a non-contact driving motor according to an embodiment of the present invention is illustrated. As shown in FIG. 3, the non-contact driving motor includes a housing 10, a sleeve 20 integrally formed at the housing 10, a stator assembly 30 fitted around the sleeve 20, a shaft 40 rotatably inserted in the sleeve 20, and a rotor assembly 50 coupled to the upper end of the shaft 40. This configuration is similar to those of conventional spindle motors, in particular, for hard disc drivers.

The sleeve 20 has a tube shape and extends upwardly from the central portion of the housing 10. The stator assembly 30 includes a core formed by laminating a plurality of thin plates, and coils wound around poles extending radially from the core.

The rotor assembly 50 mainly includes a rotor case 51, and a driving magnet 52. The shaft 40 is coupled to the central portion of the rotor case 51. The driving magnet 52, which has an annular shape, is attached to the outer peripheral end of the rotor case 51 in such a fashion that it faces the stator assembly 30.

In accordance with the illustrated embodiment of the present invention, the non-contact driving motor has a feature in that the radial and axial weights of the shaft 40 with respect to the sleeve 20 are supported by a plurality of magnets so that the shaft 40 can be usually driven in a non-contact state.

That is, a first magnet 60, which has an annular shape, is attached to the inner peripheral surface of the sleeve 20. A second magnet 70, which has an annular shape, is also attached to the outer peripheral surface of the shaft 40 in such a fashion that it faces the first magnet 60 in a horizontal direction.

Figure 4:
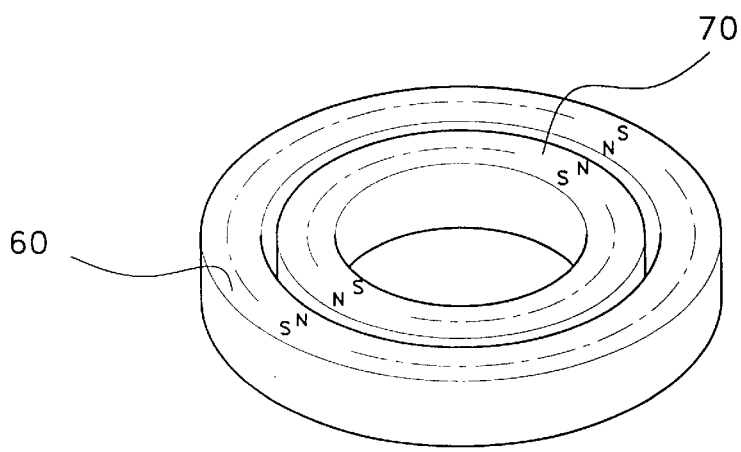
FIGS. 4 and 5 are perspective views illustrating respective magnetized structures of first and second magnets according to the embodiment of the present invention.

The first and second magnets 60 and 70 have different diameters, respectively, in such a fashion that the first magnet 60 surrounds the second magnet 70, as shown in FIG. 4. In the case of FIG. 4, each of the magnets 60 and 70 is magnetized with N and S poles radially arranged. Preferably, the magnets 60 and 70 have the same polarity at their facing surfaces.

Figure 5:
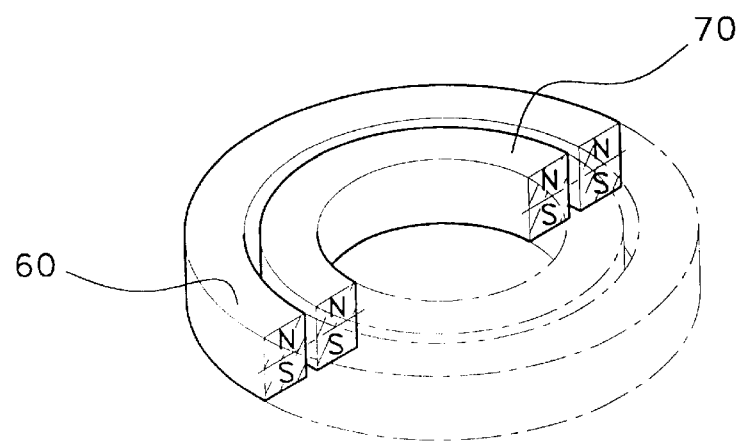
Figure 6:
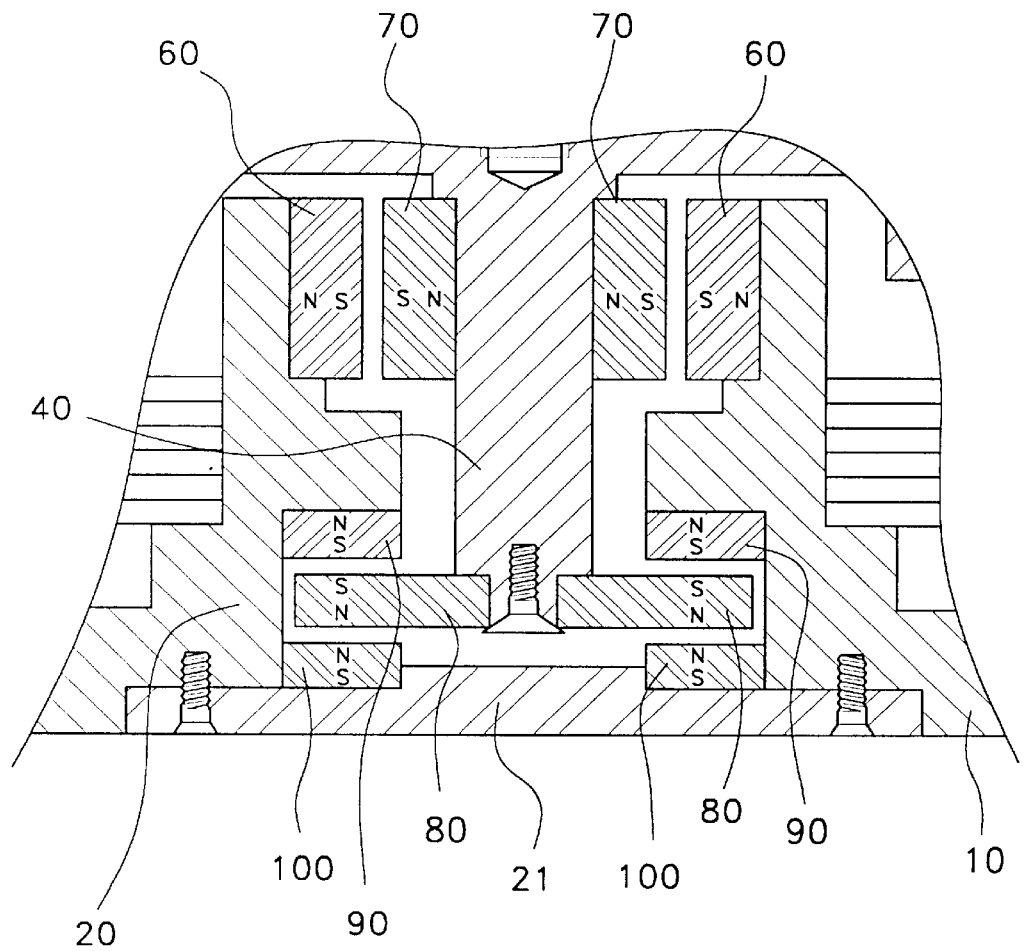
FIG. 6 is an enlarged cross-sectional view corresponding to a portion of FIG. 3, illustrating respective magnetized structures of third, fourth, and fifth magnets according to the embodiment of the present invention.

Alternatively, each of the magnets 60 and 70 may have opposite poles axially arranged, as shown in FIG. 5. In this case, the magnets 60 and 70 have pole arrangements shown in FIG. 5 so that they have the same polarity at their facing surfaces, as in the case of FIG. 4. Thus, a repulsive force is always exerted between the first and second magnets 60 and 70.

The repulsive force generated between the first and second magnets 60 and 70 serves to support the radial weight of the shaft 40. Accordingly, it is possible to maintain a more accurate concentricity between the sleeve 20 and shaft 40 in a non-contact state.

In accordance with the illustrated embodiment of the present invention, a third magnet 80, which has a disc shape, is also provided which is fitted around the lower end of the shaft 40. The third magnet 80 has a magnetized structure having N and S poles vertically arranged. A fourth magnet 90 and a fifth magnet 100, which have a disc shape, are also attached to the sleeve 20 and a cap 21 mounted to the lower end of the sleeve 20, respectively, in such a fashion that they face the third magnet 80 in a vertical direction at opposite surfaces of the third magnet 80 respectively.

Preferably, the fourth and fifth magnets 90 and 100 have pole arrangements so that they have the same polarity as the third magnet 80 at their surfaces facing the third magnet 80, respectively.

In this case in which the third magnet 80 is arranged in such a fashion that it has the same polarity as the fourth and fifth magnets 90 and 100 at respective opposite surfaces thereof, the third magnet 80 is prevented from moving in either the upward or downward direction while being maintained in a non-contact state by virtue of the repulsion effecting between the third and fourth magnets 80 and 90 and the repulsion effecting between the third and fifth magnets 80 and 100. Accordingly, the shaft 40, to which the third magnet 80 is attached, is prevented from moving axially while maintaining a stable support force for the axial weight thereof.

Thus, in accordance with the illustrated embodiment of the present invention, the motor can be maintained under a non-contact condition while keeping a stable concentricity with respect to the radial weight by virtue of the repulsion effecting between the first and second magnets 60 and 70. Also, the motor can be maintained under a non-contact condition with respect to the axial weight by virtue of the repulsion effecting between the third and fourth magnets 80 and 90 and the repulsion effecting between the third and fifth magnets 80 and 100.

Figure 7:
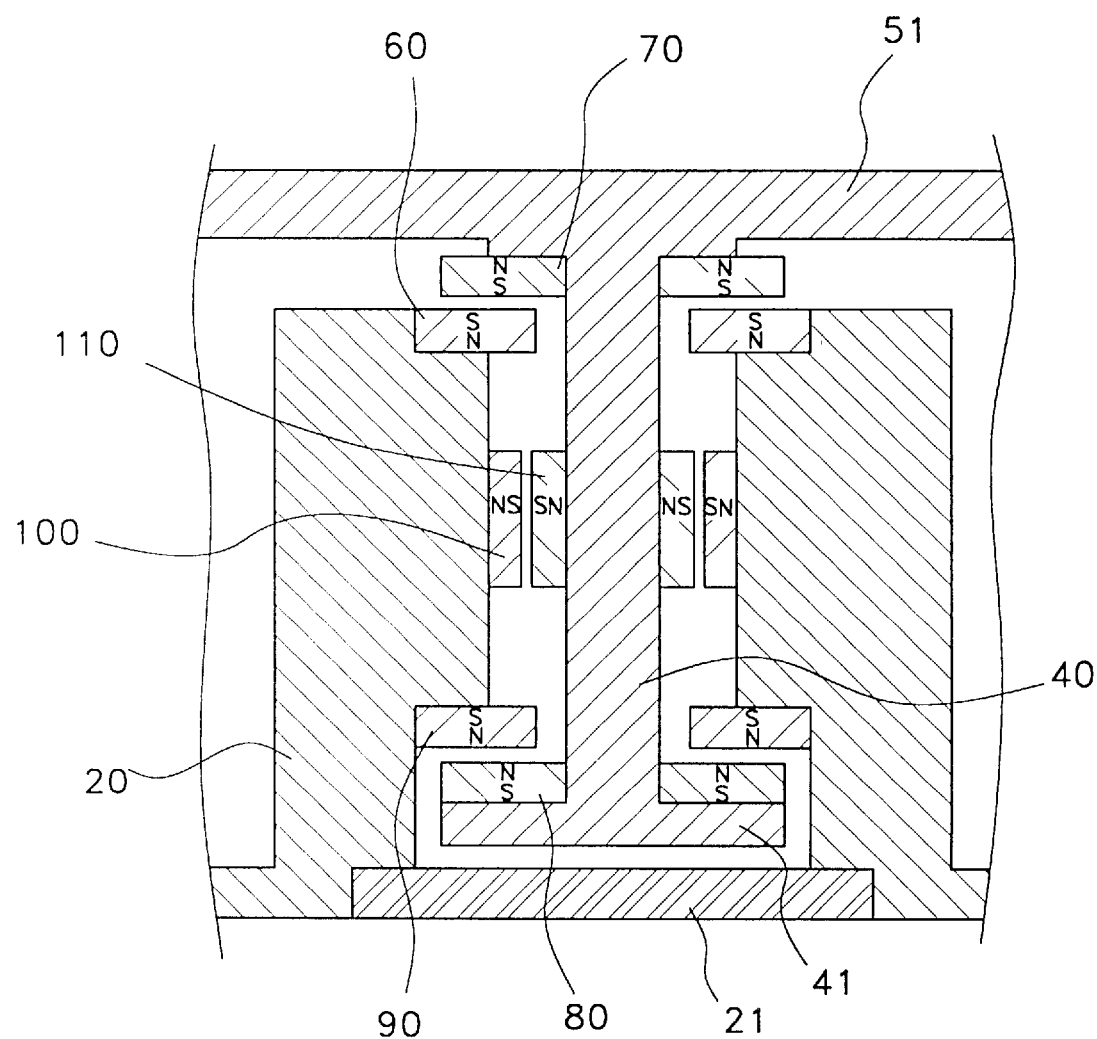
FIG. 7 is an enlarged cross-sectional view illustrating a non-contact driving motor according to another embodiment of the present invention.

Referring to FIG. 7, a non-contact driving motor according to another embodiment of the present invention is illustrated. In FIG. 7, elements respectively corresponding to those in FIG. 3 are denoted by the same reference numerals. As shown in FIG. 7, the non-contact driving motor includes a housing 10, a sleeve 20 formed at the housing 10, a stator assembly 30 fitted around the sleeve 20, a shaft 40 rotatably inserted in the sleeve 20, and a rotor assembly 50 coupled to the upper end of the shaft 40. This configuration is similar to those of conventional motors.

The sleeve 20 has a tube shape and extends upwardly from the central portion of the housing 10. The stator assembly 30 includes a core formed by laminating a plurality of thin plates, and coils wound around poles extending radially from the core. The rotor assembly 50 mainly includes a rotor case 51, and a driving magnet 52. The shaft 40 is coupled to the central portion of the rotor case 51. The driving magnet 52, which has an annular shape, is attached to the outer peripheral end of the rotor case 51 in such a fashion that it faces the stator assembly 30. This configuration is the same as that of the embodiment illustrated in FIG. 3.

In accordance with the embodiment of the present invention illustrated in FIG. 7, the shaft 40 is provided at its lower end with a planar flange 41. The planar flange 41 is integral with the shaft 40 and has a diameter larger than that of the shaft 40. The planer flange 41 serves to provide a surface for seating a magnet thereon. Similar to the embodiment of FIG. 3, the non-contact driving motor according to this embodiment is configured to support the radial and axial weights of the shaft 40 with respect to the sleeve 20 using a plurality of magnets in order to allow the shaft 40 to be usually driven in a non-contact state.

That is, in accordance with this embodiment, a first magnet 60, which has a disc shape, is attached to the upper end of the sleeve 20. The first magnet 60 is magnetized with N and S poles vertically arranged. For an attachment of the first magnet 60, the sleeve 20 has, at the upper end thereof, a stepped structure providing an annular recess adapted to receive the first magnet 60. A second magnet 70, which has a disc shape, is also attached to the rotor case 51 in such a fashion that it faces the first magnet 60 in a vertical direction. The second magnet 70 is magnetized with N and S poles vertically arranged in such a fashion that it has the same polarity as the first magnet 60 at their facing surfaces.

A third magnet 80, which has a disc shape, is also attached to the upper surface of the flange 41 integrally formed at the lower end of the shaft 40. The third magnet 80 is magnetized with N and S poles vertically arranged. A fourth magnet 90 having a disc shape is also attached to the sleeve 20 in such a fashion that it faces the third magnet 80 in a vertical direction above the third magnet 80. For an attachment of the fourth magnet 90, the sleeve 20 has, at the lower portion thereof, a stepped structure providing an annular recess adapted to receive the fourth magnet 90. The fourth magnet 90 is magnetized with N and S poles vertically arranged in such a fashion that it has the same polarity as the third magnet 80 at their facing surfaces.

Also, a fifth magnet 100, which has an annular shape, is attached to the inner peripheral surface of the sleeve 20 between the first and fourth magnets 60 and 90. The fifth magnet 100 is magnetized with N and S poles radially arranged. A sixth magnet 110 having an annular shape is also attached to the peripheral surface of the shaft 40 in such a fashion that it faces the fifth magnet 100 in a horizontal direction. The sixth magnet 110 is magnetized with N and S poles radially arranged in such a fashion that it has the same polarity as the fifth magnet 100 at their facing surfaces.

Since the second and third magnets 70 and 80 respectively attached to the rotor case 51 and the flange 41 of the shaft 40 face the first and fourth magnets 60 and 90, respectively attached to the upper and lower portions of the sleeve 20, in such a fashion that they have the same polarity as their facing surfaces, in accordance with the above mentioned embodiment of the present invention, a repulsion generated between the facing magnets by virtue of the same polarity is exerted at each end of the shaft 40. When the repulsion exerted at the upper end of the shaft 40 and the repulsion exerted at the lower end of the shaft 40 are balanced, the shaft 40 is substantially prevented from moving axially along the sleeve 20.

Even in a state in which the motor is not driven, the first magnet 60 maintains the repulsion serving to upwardly push the second magnet 70, and the fourth magnet 90 maintains the repulsion serving to downwardly push the third magnet 80. Accordingly, the flange 41 of the shaft 40 and the rotor case 51 are maintained in a state not coming into contact with any element.

Also, since the fifth and sixth magnets 100 and 110 face each other in horizontal and radial directions in such a fashion that they have the same polarity at their facing surfaces, a repulsion is generated between the facing magnets 100 and 110, thereby preventing a lateral or radial movement of the shaft 40. Thus, the shaft 40 is maintained in a non-contact state with respect to the sleeve 20.

In accordance with the above mentioned embodiment of the present invention, the motor is configured to support the axial weight by the repulsion exerted between the first and second magnets 60 and 70 at the upper portion of the sleeve 20 and the repulsion exerted between the third and fourth magnets 80 and 90 at the lower portion of the sleeve 20 and to support the radial weight by the repulsion exerted between the fifth and sixth magnets 100 and 110, thereby enabling a complete non-contact driving thereof.

As apparent from the above mentioned embodiments of the present invention, the axial weight and radial weight of the shaft are supported using a plurality of magnets arranged in such a fashion that they have the same polarity at their facing surfaces. Accordingly, the shaft 40 and the rotor case 51 are maintained in a state not coming into contact with any element. Thus, occurrence of contact abrasion in the motor can be prevented.

The non-contact driving motor of the present invention has no or little driving resistance even in a stoppage or start-up state, so that it exhibits an improved drivability. Thus, the non-contact driving motor of the present invention is configured to maintain stable supporting forces for axial and radial weights between the fixed member, that is, the sleeve, and the rotating member, that is, the shaft, under a non-contact condition, using the facing first and second magnets, facing third and fourth magnets, and facing fifth and sixth magnets having the same polarity at their facing surfaces, thereby achieving an improvement in the driving characteristics thereof and an enhancement in durability to obtain an improvement in the reliability of the product.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A non-contact driving motor comprising
   a housing;
   a sleeve extending upwardly from a central portion of the housing and having a tube shape;
   a stator assembly fitted around the sleeve, the stator assembly including a combination of a core and coils;
   a vertical shaft rotatably inserted in the sleeve;
   a rotor assembly including a rotor case centrally coupled to an upper end of the shaft, and an annular driving magnet attached to an outer peripheral end of the rotor case in such a fashion that it faces the stator assembly;
   an annular, radially magnetized, first magnet attached to an inner peripheral surface of the sleeve at an upper end of the sleeve;
   an annular second magnet magnetized radially but opposite to the first magnet and attached to an outer peripheral surface of the shaft in such fashion that it faces the first magnet;
   a disc-shaped third magnet fitted around the lower end of the shaft, the third magnet having a diameter larger than the diameter of the shaft;
   a disc-shaped fourth magnet attached to the inner peripheral surface of the sleeve at a level upwardly spaced apart from the third magnet by a desired distance in such a fashion that it faces the third magnet in a vertical direction; and
   a disc-shaped fifth magnet attached to a cap covering the lower end of the sleeve at a level downwardly spaced apart from the third magnet by a desired distance in such a fashion that it faces the third magnet in a vertical direction.

2. The non-contact driving motor according to claim 1, wherein each of the first and second magnets is magnetized with N and S poles radially arranged in such a fashion that the first and second magnets have the same polarity at facing surfaces thereof.

3. The non-contact driving motor according to claim 1, wherein each of the third, fourth, and fifth magnets is magnetized with N and S poles vertically arranged in such a fashion that the fourth and fifth magnets have the same polarity as the third magnet at respective surfaces thereof facing the third magnet.

4. A non-contact driving motor comprising:
   a housing;
   a sleeve extending upwardly from a central portion of the housing and having a tube shape;
   a stator assembly fitted around the sleeve, the stator assembly including a combination of a core and coils;
   a vertical shaft rotatably inserted in the sleeve;
   a rotor assembly including a rotor case centrally coupled to an upper end of the shaft, and an annular driving magnet attached to an outer peripheral end of the rotor case in such a fashion that it faces the stator assembly;
   a disc-shaped first magnet attached to an upper end of the sleeve and magnetized with N and S poles vertically arranged;
   a disc-shaped second magnet attached to the rotor case in such a fashion that it faces the first magnet in a vertical direction above the first magnet, the second magnet being magnetized with N and S poles vertically arranged in such a fashion that it has the same polarity as the first magnet at facing surfaces thereof;
   a disc-shaped third magnet attached to an upper surface of a flange integrally formed at a lower end of the shaft, the third magnet being magnetized with N and S poles vertically arranged;
   a disc-shaped fourth magnet attached to an inner peripheral surface of the sleeve in such a fashion that it faces the third magnet in a vertical direction above the third magnet, the fourth magnet being magnetized with N and S poles vertically arranged in such a fashion that it has the same polarity as the third magnet at facing surfaces thereof;
   an annular fifth magnet attached to the inner peripheral surface of the sleeve between the first and fourth magnets, the fifth magnet being magnetized radially; and
   an annular sixth magnet attached to a peripheral surface of the shaft in such a fashion that it faces the fifth magnet in a, the sixth magnet being magnetized radially but opposite to the fifth magnet at facing surfaces thereof.

* * * * *